(12) United States Patent
Harkleroad et al.

(10) Patent No.: US 10,406,694 B2
(45) Date of Patent: Sep. 10, 2019

(54) CONTAINER GRIPPER ASSEMBLY

(71) Applicant: AGR INTERNATIONAL, INC., Butler, PA (US)

(72) Inventors: William Harkleroad, Worthington, PA (US); William E. Schmidt, Gibsonia, PA (US); George Fleeger, Kittanning, PA (US); Jeremy Fleeger, Worthington, PA (US); Paul Di Zinno, Cabot, PA (US)

(73) Assignee: AGR INTERNATIONAL, INC., Butler, PA (US)

( * ) Notice: Subject to any disclaimer, the term of this patent is extended or adjusted under 35 U.S.C. 154(b) by 0 days.

(21) Appl. No.: 16/094,038

(22) PCT Filed: Apr. 19, 2017

(86) PCT No.: PCT/US2017/028377
§ 371 (c)(1),
(2) Date: Oct. 16, 2018

(87) PCT Pub. No.: WO2017/184740
PCT Pub. Date: Oct. 26, 2017

(65) Prior Publication Data
US 2019/0126491 A1 May 2, 2019

Related U.S. Application Data

(60) Provisional application No. 62/325,278, filed on Apr. 20, 2016.

(51) Int. Cl.
*B25J 15/00* (2006.01)
*B66C 1/44* (2006.01)

(52) U.S. Cl.
CPC ....... *B25J 15/0038* (2013.01); *B25J 15/0028* (2013.01); *B29C 2949/78* (2013.01); *B66C 1/44* (2013.01)

(58) Field of Classification Search
CPC .......... B25J 15/038; B25J 15/028; B66C 1/44
(Continued)

(56) References Cited

U.S. PATENT DOCUMENTS 2,226,789 A   12/1940 Tupy
3,967,946 A * 7/1976 Campbell ............. C03B 9/3535
                                                        65/68

(Continued)

FOREIGN PATENT DOCUMENTS

DE       10140315 A    3/2003

OTHER PUBLICATIONS

International Search Report and Written Opinion for International Application No. PCT/US2017/028377 dated Jul. 21, 2017.

*Primary Examiner* — Paul T Chin
(74) *Attorney, Agent, or Firm* — K&L Gates LLP

(57) ABSTRACT

Various examples are directed to a container gripper assembly comprising a first jaw member and a second jaw member. The first jaw member may comprise a first plurality of pivotable inserts and the second jaw member may comprise a second plurality of pivotable inserts. The first jaw member may be movable towards the second jaw member to grip a container between the first plurality of pivotable inserts and the second plurality of pivotable inserts.

13 Claims, 15 Drawing Sheets

(58) Field of Classification Search
USPC ........... 294/119.1, 207, 201, 901; 198/803.3, 198/803.7, 803.9, 803.11; 414/590, 591, 414/751.1
See application file for complete search history.

(56) References Cited

U.S. PATENT DOCUMENTS

| | | | | |
|---|---|---|---|---|
| 4,475,607 A * | 10/1984 | Haney | ..................... | E21B 19/16 173/166 |
| 4,600,357 A | 7/1986 | Coules | | |
| 4,995,896 A | 2/1991 | Denney et al. | | |
| 5,201,501 A * | 4/1993 | Fassler | ..................... | B23Q 1/76 269/156 |
| 5,366,340 A | 11/1994 | Vo et al. | | |
| 5,845,549 A * | 12/1998 | Bouligny | .............. | E21B 19/164 81/57.33 |
| 5,917,898 A * | 6/1999 | Bassa | ................... | H04M 3/2254 370/241 |
| 6,116,118 A * | 9/2000 | Wesch, Jr. | ............ | E21B 19/161 81/57.16 |
| 6,371,717 B1 | 4/2002 | Grams et al. | | |
| 7,418,834 B2 * | 9/2008 | Lang | ....................... | C03B 9/447 269/268 |
| 7,472,565 B1 * | 1/2009 | Heldoorn | ................ | B28B 3/00 269/268 |
| 7,748,297 B2 * | 7/2010 | Belik | ...................... | B25B 5/147 81/57.33 |
| 8,191,948 B2 | 6/2012 | Preti et al. | | |
| 8,356,848 B2 | 1/2013 | Sarda | | |
| 8,500,385 B2 * | 8/2013 | Jin | ........................... | B25J 9/041 294/119.1 |
| 8,910,985 B2 | 12/2014 | Neeper | | |
| 9,022,442 B2 * | 5/2015 | Rousseau | ............ | B29C 49/4205 294/106 |

\* cited by examiner

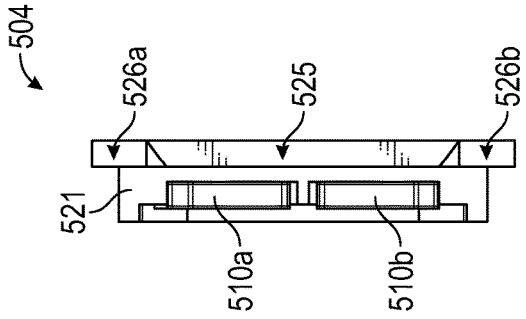
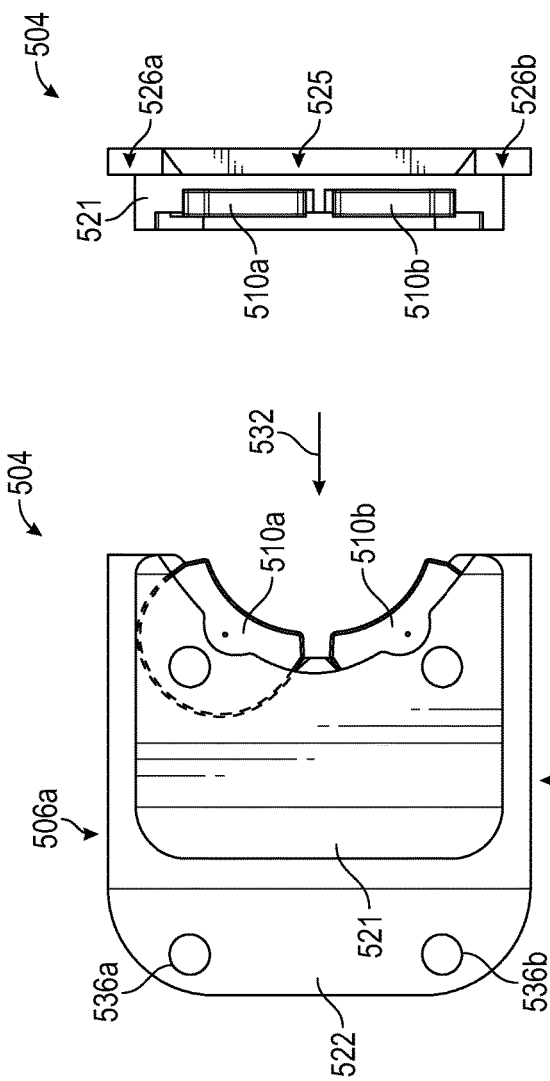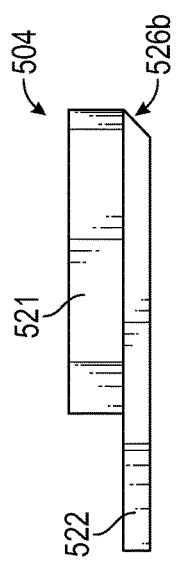

CONTAINER GRIPPER ASSEMBLY

PRIORITY APPLICATION

This application is a National Stage of International Application No. PCT/US2017/028377, filed Apr. 19, 2017, which claims priority to U.S. Provisional Application Ser. No. 62/325,278, filed Apr. 20, 2016, the disclosure of which is incorporated herein in its entirety by reference.

TECHNICAL FIELD

The examples in this description and drawings generally relate to container gripper assemblies, for example, insert holders configured for use with containers of different sizes and/or shapes.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIGS. 5-7 show views of an example insert holder with inserts.

DETAILED DESCRIPTION

It is often desirable to grip bottles and other types of containers mechanically. During manufacturing, for example, containers may be gripped and held during various on or off-line testing. Such testing may include destructive testing, such as pressure testing, stress testing, etc., as well as non-destructive testing, such as fill testing, defect detection, etc. Also, in some examples, a container may be gripped and moved from one production stage to another, such as from a mold to a production line. It may also be desirable to mechanically grip containers after manufacturing. For example, lab equipment for performing pressuring testing, fill testing, and other testing on the container may include gripper assemblies to maintain container positioning during testing. It is envisioned that container gripper assemblies, as described herein may be used in these and other applications.

Figure 1:
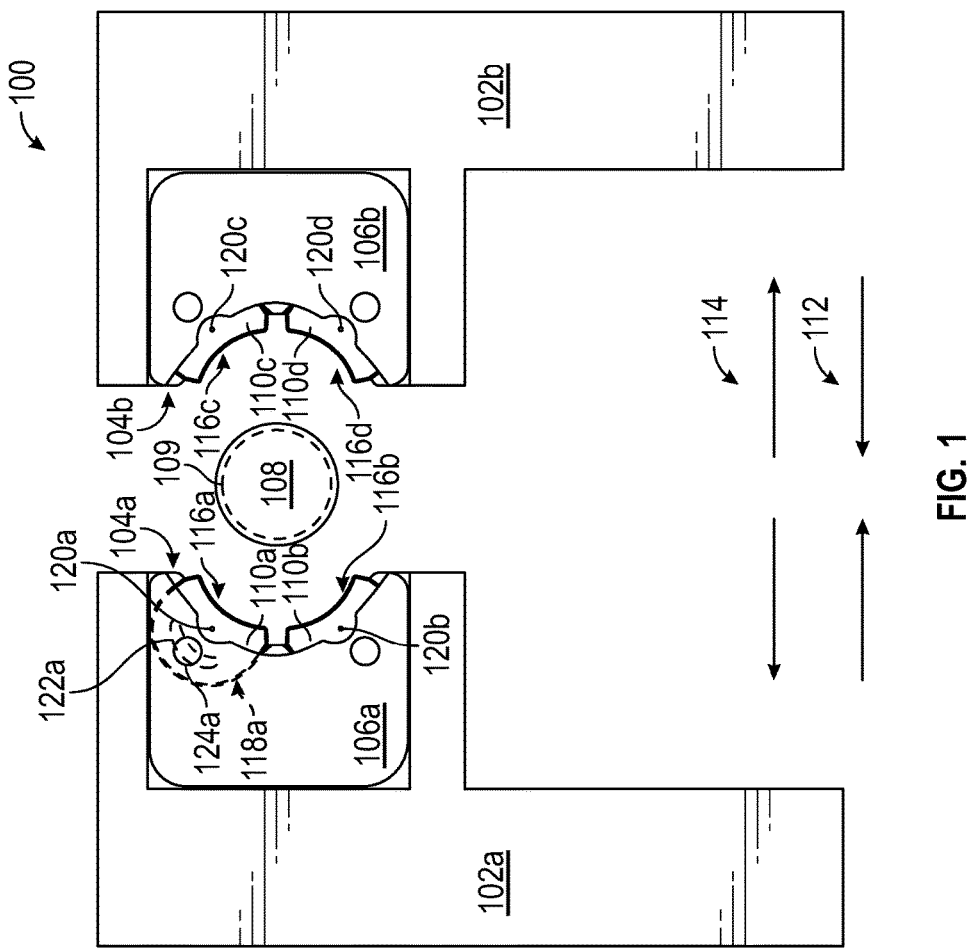
FIG. 1 is diagram showing a top view of an example of a container gripper assembly including insert holders.

FIG. 1 is diagram showing a top view of an example of a container gripper assembly 100. The container gripper assembly 100 includes jaw members 102a, 102b and insert holders 104a, 104b. A cross section of an example container 108 is also shown between the respective insert holders 104a, 104b. In some examples, the container 108 is a bottle, such as a beer or wine bottle and the cross section shown in FIG. 1 is taken at the neck of the bottle. For example, the gripper assembly 100 may grip the container at its neck. Additional details showing the positioning of jaw members on a container are provided with respect to FIG. 4 below.

The jaw members 102a, 102b may be movable towards one another to grip the container 108, as indicated by arrows 112, and away from one another to release the container 108, as indicated by arrows 114. For example, the jaw members 102a, 102b may open and close while remaining substantially parallel to each other. Example jaw members that open and close in a pivotable manner are described herein below, for example, with respect to FIG. 2. The jaw members 102a, 102b are actuated by any suitable drive system such as, for example, an electric motor coupled to a suitable gear arrangement, such as a cam or worm screw gear arrangement. Insert holders 104a, 104b are distinct from the respective jaw members 102a, 102b and are optionally removable or replaceable. In some examples, however, insert holders 104a, 104b are integral components of the jaw members 102a, 102b.

As shown in the example of FIG. 1, the insert holders 104a, 104b comprise body portions 106a, 106b and inserts 110a, 110b, 110c, 110d. In the example shown, each insert holder 104a, 104b includes two pivotable inserts 110a, 110b, 110c, 110d. For example, insert holder 104a includes inserts 110a and 110b and insert holder 104b includes inserts 110c and 110d. In some examples, insert holders, such as 104a and 104b, may include more or fewer inserts than are shown. Body portions 106a, 106b are optionally constructed from a plastic, a metal (e.g., aluminum, steel, brass, etc.), or any other suitable material having structural integrity to reliably grip a bottle or other container 108. Inserts 110a, 110b, 110c, 110d are made from materials that are structurally robust enough to grasp the container 108 while at the same time not damaging or breaking the container 108.

Figure 4:
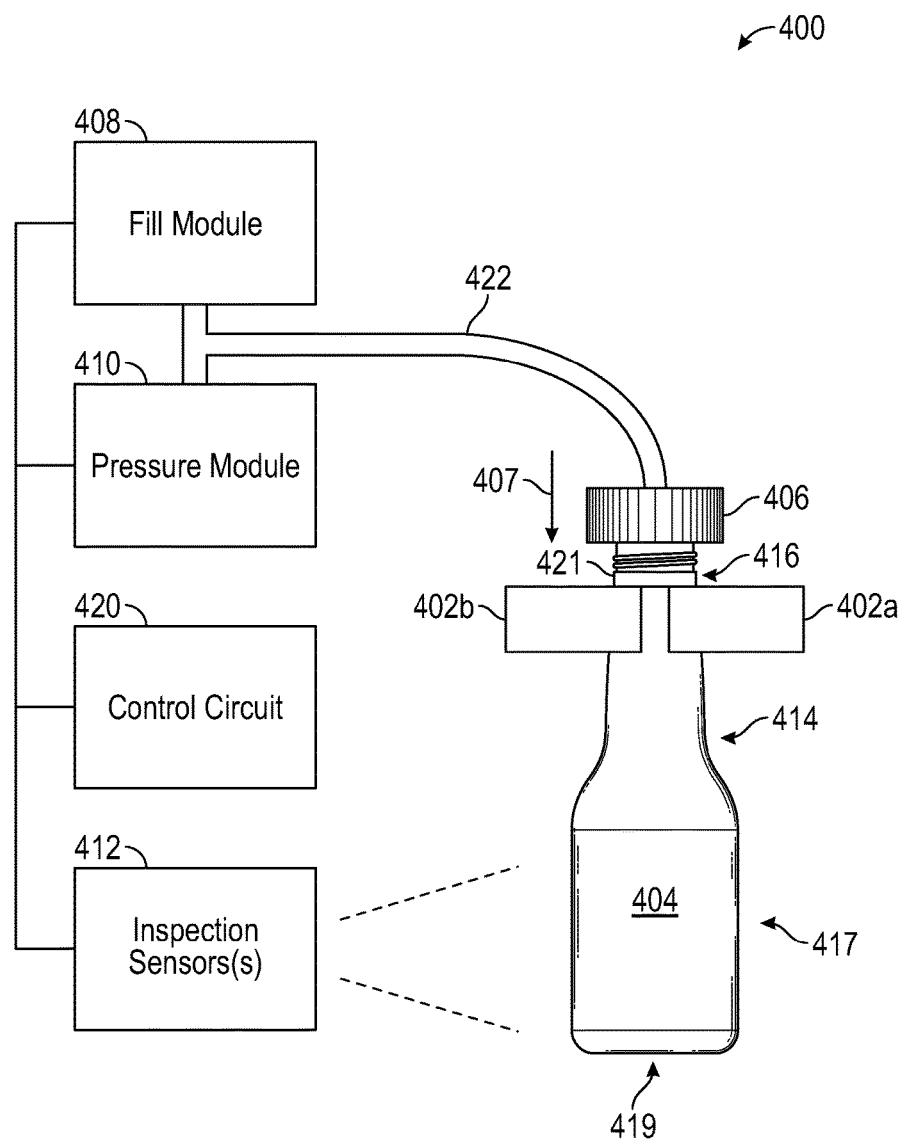
FIG. 4 is a diagram showing a system that illustrates example uses for jaw assemblies described herein.

In some examples, the inserts described herein may be made from a material that is has lateral loading strength sufficient to allow it to support the weight of a container and seal pressed against the container to maintain a seal for pressuring testing (See FIG. 4). In some examples, the inserts 110, 110b, 110c, 110d may be made from a material with a flexural strength of between about 10 and about 50 kpsi. In some examples, the inserts 110, 110b, 110c, 110d may be made from a material with a tensile strength of between about 5 kpsi and about 30 kpsi. Also, in some examples, the inserts described herein may be made from a material with wear properties suitable for repeated gripping of containers without significant change of shape due to wear. Examples materials for the inserts 110a, 110b, 110c, 110*d* include polymers, such as polyethylene terephthalate (PET), polyvinyl chloride (PVC), a polyamide-imide, such as marked under the name TORLON, etc. In some examples, a resin or fiberglass reinforcement may be used in any of the polymer insert materials described herein.

Inserts 110*a*, 110*b*, 110*c*, 110*d* may comprise concave surfaces 116*a*, 116*b*, 116*c*, 116*d*. The inserts 110*a*, 110*b*, 110*c*, 110*d* may be positioned within the body portions 106*a*, 106*b* to orient the concave sections 116*a*, 116*b*, 116*c*, 116*d* towards the container 108 as shown. In some examples, the concave sections 116*a*, 116*b*, 116*c*, 116*d* may have multiple sections curved at different radii, for example, as described herein below, for example, with respect to FIG. 8. In some examples, the inserts 110*a*, 110*b*, 110*c*, 110*d* may be pivotable, for example, about pivot points 120*a*, 120*b*, 120*c*, 120*d*. Inserts 110*a*, 110*b*, 110*c*, 110*d* may comprise convex surfaces, for example, opposite the concave surfaces 116*a*, 116*b*, 116*c*, 116*d*. An example convex surface 118*a* is shown in a dotted line to indicate that it is hidden within the body portion 106*a*. The body portion 106*a* may have a concave section with a size (e.g., radius) that corresponds to the radius of the convex surface 118*a*. In this way, the insert 110*a*, 110*b*, 110*c*, 110*d* may slide along the concave section of the body portion 106*a* to pivot about the pivot point 120*a*. For example, the pivot point 120*a* may be positioned at a center of a radius of the convex surface 118*a* and/or a center of a radius of the concave surface of the body portion 106*a*. In some examples, the radius of the convex surface 118*a* may be selected to place the pivot point 120*a* at a center of mass of the insert 110*a*. Additional details of the concave surface of the body portion 106*a* are described herein, for example, with respect to FIGS. 13-14.

In some examples, as the jaw members 102*a*, 102*b* are closed and the insert holders 104*a*, 104*b* move towards one another (arrows 112), inserts 110*a*, 110*b*, 110*c*, 110*d* contact the container 108. The inserts 110*a*, 110*b*, 110*c*, 110*d*, movable relative to the remainder of the insert holders 104*a*, 104*b*, self-align, for example, such that the concave surfaces 118*a*, 118*b*, 118*c*, 118*d* face the container 108 and engage the container in reliable surface-to-surface (e.g., including multiple point) contact with the container 108. Additional description of the self-alignment of the inserts 110*a*, 110*b*, 110*c*, 110*d* are provided herein, for example, with respect to FIGS. 21 and 22. Also, in some examples, a neck support ring 109 or other feature of the container 108 may rest directly on the inserts 110*a*, 110*b*, 110*c*, 110*d*. Accordingly, downward pressure on the container 108, for example, from a seal creating a fluid-tight seal at a finish of the container 108, may be borne, in whole or in part, by the inserts 110*a*, 110*b*, 110*c*, 110*d*.

In some examples, inserts 110*a*, 110*b*, 110*c*, 110*d* may be secured to the body portions 106*a*, 106*b* with a detent and curved notch. For example, referring to the insert 110*a*, a detent may be installed through a hole, which may be capped with a cap 124*a* in the body portion 106*a*. The detent (See FIG. 14) may be positioned to ride in a curved notch 122*a* of the insert 110*a*. As the insert 110*a* pivots about the pivot point 120*a*, the detent may slide within the curved notch 122*a*. Although only insert 110*a* is shown with the curved notch 122*a* and convex surface 118*a*, in some examples, all of the inserts 110*b*, 110*c*, 110*d* may have similar surfaces and curved notches.

In some examples, a pin, screw or other suitable fastener may secure the inserts 110*a*, 110*b*, 110*c*, 110*d* to the respective body portions 106*a*, 106*b*, 106*c*, 106 at the pivot points 120*a*, 120*b*, 120*c*, 120*d*. Fasteners at the pivot points 120*a*, 120*b*, 120*c*, 120*d* may be used in addition to or instead of detents and curved notches. In some examples, fasteners at the pivot points 120*a*, 120*b*, 120*c*, 120*d* may be omitted. For example, omitting fasteners at the pivot points 120*a*, 120*b*, 120*c*, 120*d* may permit the inserts 110*a*, 110*b*, 110*c*, 110*d* to be manufactured with the pivot points 120*a*, 120*b*, 120*c*, 120*d* nearer edges of the concave sections 116*a*, 116*b*, 116*c*, 116*d*. For example, when a fastener is positioned at a pivot point, the pivot point may positioned away from the edges of the curved sections, for example, to prevent contact between the fastener and the container which may tend to break the container.

Figure 2:
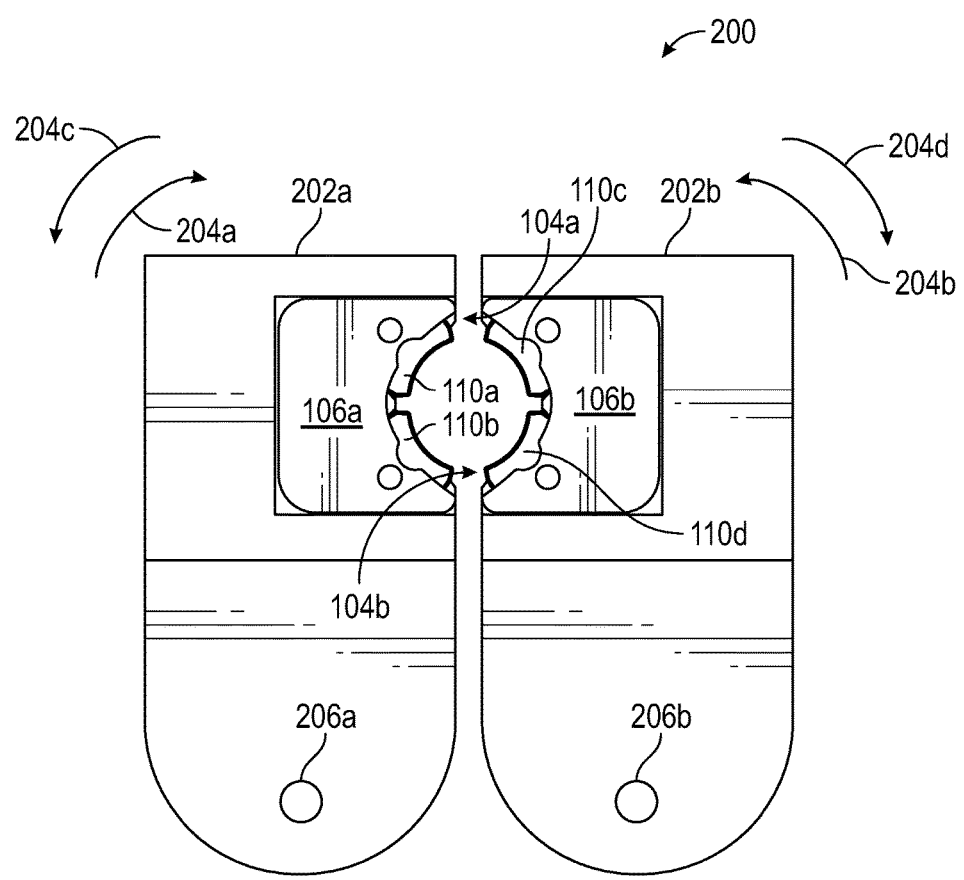
FIG. 2 is a diagram showing top view of an example of a pivotable container gripper assembly including insert holders.

FIG. 2 is a diagram showing top view of an example of a pivotable container gripper assembly 200 including insert holders 104*a*, 104*b*. In the example of FIG. 2, insert holders 104*a*, 104*b* are incorporated into pivotable jaw members 202*a*, 202*b*. Jaw members 202*a*, 202*b* may be pivotable about respective pivot points 206*a*, 206*b*. In FIG. 2, jaw members 202*a*, 202*b* are shown in a closed position. Jaw members 202*a*, 202*b* may pivot about respective pivot points 206*a*, 206*b* in the direction of arrows 204*c*, 204*d* to move to an open position. The jaw members 202*a*, 202*b* may move from an open position to a closed position by pivoting about the respective pivot points 206*a*, 206*b* in the direction of arrows 204*a*, 204*b*. Although the insert holders 104*a*, 104*b* are shown in FIG. 2, in some examples, insert holders used with pivotable jaw members, such as jaw members 202*a*, 202*b* may be modified in any suitable manner.

Figure 3:
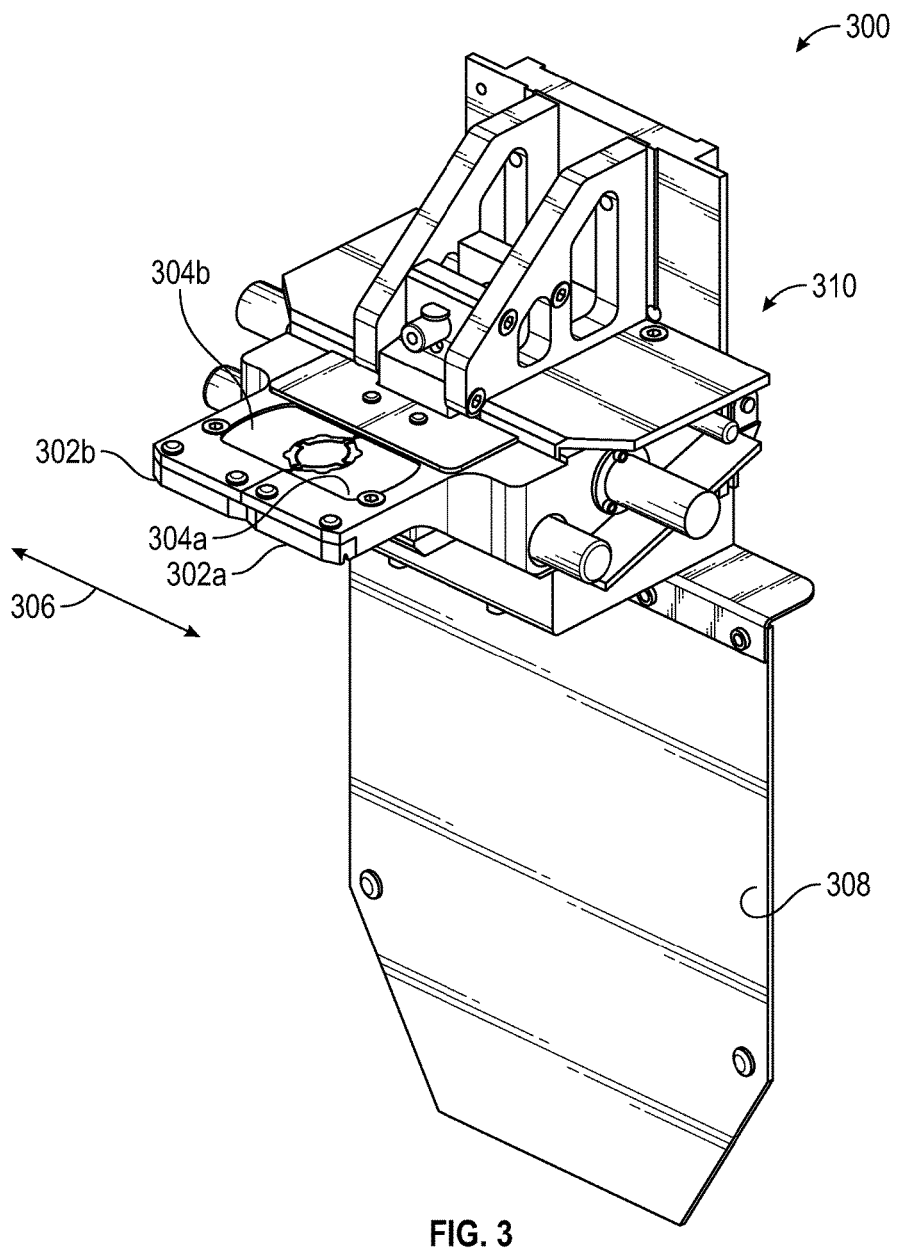
FIG. 3 is a diagram showing a perspective view of an example of a container gripper assembly including insert holders.

FIG. 3 is a diagram showing a perspective view of an example of a container gripper assembly 300 including insert holders 304*a*, 304*b*. The gripper assembly 300 includes jaw members 302*b*, 302*a* that may open and close in a substantially parallel manner, similar to the jaw members 102*a*, 102*b* of FIG. 1 and illustrated by arrow 306. Insert holders 304*a*, 304*b* may be similar to the insert holders 104*a*, 104*b* described herein. The gripper assembly 300 may comprise various other components including, for example, a frame 310 and a shroud 308. In some examples, the shroud 308 is positioned to protect equipment and/or personnel from pieces of container that are propelled away from the gripper assembly 300 during destructive testing. In some examples, the gripper assembly 300 may also include one or more motors for opening and closing the jaw members 302*a*, 302*b*. It will be appreciated that FIGS. 1-3 are examples of gripper assemblies that may be used with the insert holders and inserts described herein. Various other gripper assemblies may be used.

FIG. 4 is a diagram showing a system 400 that illustrates example uses for jaw assemblies, such as 100, 200, 300 described herein. The system 400 includes a container 404. The container 404 is gripped at a neck portion 414 (e.g., at neck ring 421) by jaw members 402*a*, 402*b*. The jaw members 402*a*, 402*b* optionally include insert holders similar to the insert holders 104*a*, 104*b*, 304*a*, 304*b* described herein.

The system 400 includes a fill module 408 and a pressure module 410. These modules 408, 410 may be configured to provide a fluid, such as water, to the container 404 via a tube 422 and seal 406. In some examples, the container 404 comprises a finish 416 extending from a top of the container 404. A support ring 421 may be positioned at a bottom portion of the finish 416. In FIG. 4, the example container 404 also includes the neck region 414 below the finish, a sidewall region 417 and a base 419. The fill module 408 may be configured to measure a volume of fluid provided to the container 404 and arrest filling when the container 404 is filled, for example, to test the interior volume of the container 404. The pressure module 410 may be configured to provide pressurized fluid, such as water, compressed air, nitrogen, oxygen, aerated fluids, or the like, to the container 404. The pressure module 410 may increase the pressure of the fluid in the container until the container bursts, thus measuring the maximum pressure capacity of the container. During pressuring testing, it may be desirable to maintain a fluid-tight seal between the seal 406 and the finish 416 of the container 404. Accordingly, the seal 406 may be configured to provide a force on the container 404 in the direction indicated by the arrow 407. In some examples, this pushes a support ring 421 of the finish 416 against the jaw members 402a, 402b. For example, the support ring 421 may rest on inserts (such as inserts 110a, 110b, 110c, 110d and others described herein) and/or a body portion of the insert assemblies. Although the tube 422 is shown coupled to the fill module 408 and the pressure module 410, it is envisioned that other testing modules that provide fluid to the container 404 may be used with the jaw members 402a, 402b.

The system 400 also includes one or more inspection sensors 412. Inspection sensors 412 may include contact sensors, such as capacitive sensors that touch the container 404, and/or non-contact sensors such as photosensors, ultrasound transducers, cameras, etc. Although inspection sensors 412 are shown in FIG. 4 to be directed at a sidewall 417 of the container 404, in some examples, one or more inspection sensors 412 may be directed at a base 419, finish 416, neck 414 or any other suitable area of the container 404. Optionally, the one or more sensors 412 are configured to measure one or more characteristics within the container 404, such as fill level.

A control circuit 420 may be in communication with the various modules 408, 410 and one or more sensors 412. The control circuit 420 may comprise one or more processors, programmable logic controllers (PLCs), field programmable gate arrays (FPGAs), logic gates, and/or other programmable hardware configured to direct the operation of the various modules 408, 410 and sensors(s) 412. In some examples, the control circuit 420 may also be programmed to receive and process data received from the various modules 408, 410 and sensors 412. The modules 408, 410 and sensors 412 are provided as example use cases for the jaw members 402a, 402b. In some examples, the system 400 may omit any combination of the modules 408, 410 and sensors 412 and/or may include additional sensors or modules in any suitable combination.

FIGS. 5-7 show views of an example insert holder 504 with inserts 510a, 510b. FIG. 5 shows a top view of the insert holder 504, for example, from the perspective shown of the insert holder 104a in FIGS. 1 and 2. FIG. 6 shows a side view of the insert holder 504 in the direction of the arrow 532. FIG. 7 shows a side view of the insert holder 504 in the direction of the arrow 534. FIGS. 5-7 illustrate a body portion 506a including a skirt section 522 and an insert mounting section 521. The skirt 522, in some examples, is received into a jaw member, such as 102a, 202a, 302a, 402a, etc., to secure the insert holder 504 to the jaw member. In some examples, the skirt 522 is sized for friction fitting into the jaw member. In the example of FIG. 5, the skirt 522 includes holes 536a, 536b used to secure the insert holder 504 to a receiving assembly. The insert mounting section 521, as shown in FIG. 7, may be thicker than the skirt 522, for example, to include cavities for receiving the inserts 510a, 510b, for example, as illustrated in FIGS. 14-20. FIGS. 6 and 7, respectively, illustrate chamfered edges 525, 526a, 526b directed toward the container when the insert holder 504 is in use. The chamfered edges 525, 526a, 526b are optionally angled from top to bottom, as illustrated. For example, many containers increase in diameter from top to bottom. Because chamfering removes excess mass, placing the chamfered edges 525, 526a, 526b as shown may remove mass that could contact lower, larger diameter portions of a containers. This may minimize (e.g., reduce or prevent) unwanted contact between the body portion 506a and a container.

Figure 8:
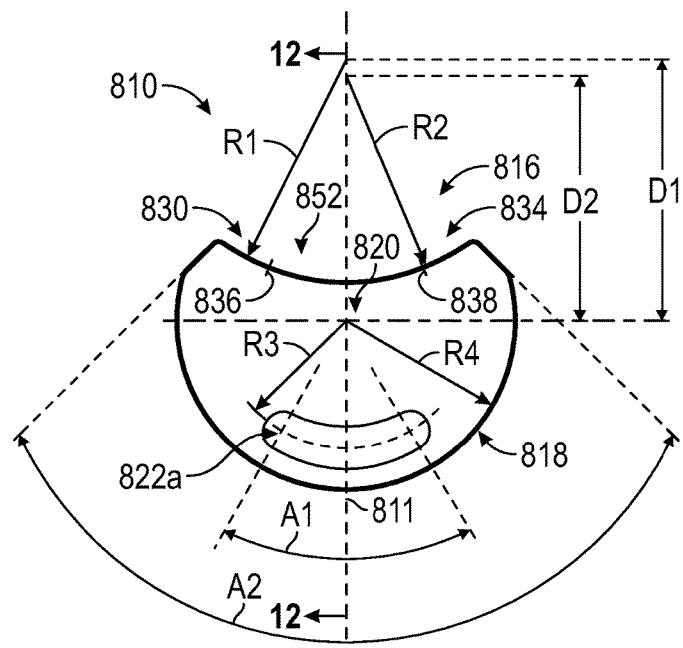
FIGS. 8-12 show views of an example insert.
Figure 9:
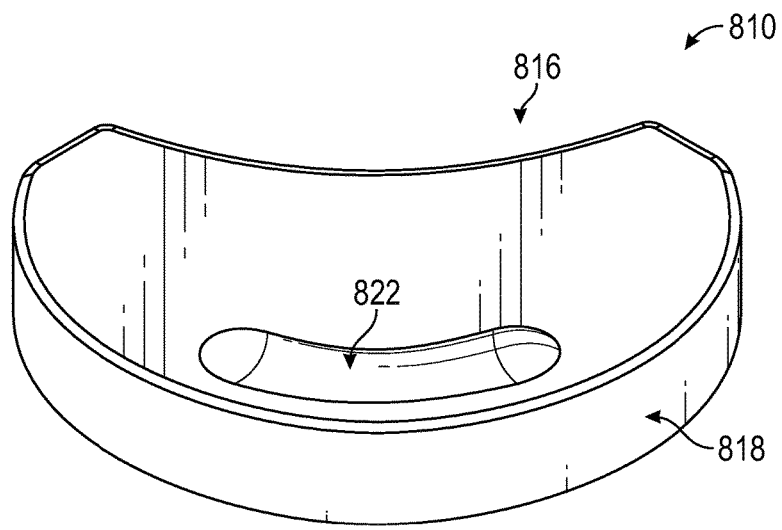
Figure 11:
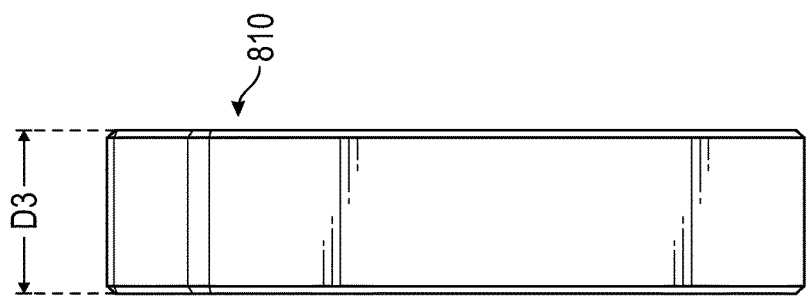
Figure 10:
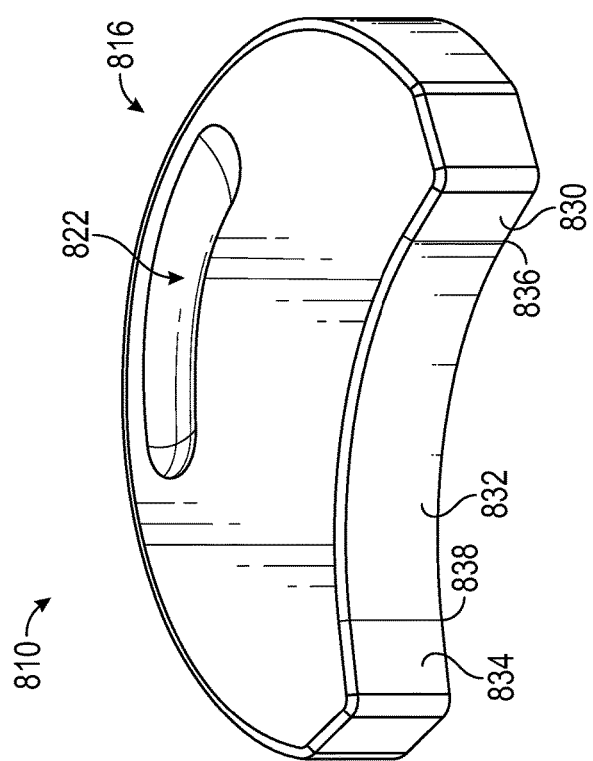
Figure 12:
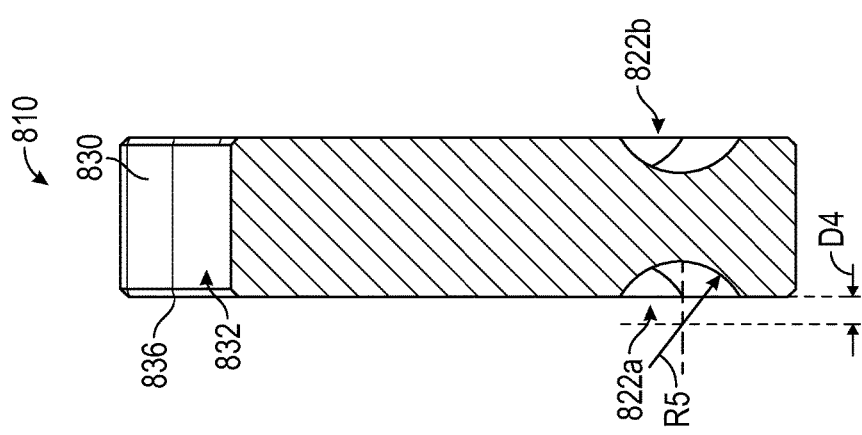

FIGS. 8-12 show views of an example insert 810. FIG. 8 is a top view of an example insert 810. FIGS. 9 and 10 show perspective views of the example insert 810. FIG. 11 shows a side view of the example insert 810. FIG. 12 shows a cross-sectional view of the example insert 810 along the line AA shown in FIG. 8. FIGS. 8, 11, and 12 include dimensions for various features of the example insert 810. These are examples showing one manner in which the example insert 810 may be configured. Inserts according to various examples may be constructed with suitable dimensions and/or tolerances different from those shown in FIGS. 8, 11, and 12. The example insert 810 is optionally used in place of one, all, or any combination of the inserts 110a, 110b, 110c, 110d described herein above. FIG. 8 shows an example curved notch 822a and convex surface 818, for example, similar to those described above with respect to FIG. 1.

FIG. 8 also shows a concave surface 816 similar to the concave surface 116a described above. The concave surface 816 includes sections 830, 832, 834 and transitions 836, 838. In some examples, edge sections 830 and 834 may be curved at a first radius R1 and a central section 832 may be curved at a second radius R2. In some examples, R2 is less than R1. In some examples, R1 may be between about 0.45 inches and 0.5 inches and R2 may be between about 0.42 inches and 0.48 inches. Radii R1 and R2 may be measured in any suitable manner. In some examples, Radii R1 and R2 may be measured along a center axis 811 offset from the pivot point 820 of the insert 810. For example, R1 may be measured from a position offset from the pivot point 820 by a distance D1. D1 may be any suitable value including, for example, between 0.55 and 0.59 inches. The radius R2 may be measured from a position offset from the pivot point 820 by a distance D2, which may be any suitable value including, for example, between 0.52 and 0.56 inches.

In some examples, the radii R1 and R2 may be selected to correspond the radius or diameter of containers to be gripped with a gripper assembly including the insert 810. For example, the larger first radius of the edge sections 830, 834 may be substantially similar to the radius of the largest container to be gripped by the insert 810. Similarly, in some examples, the smaller second radius of the central section 832 may be substantially similar to the radius of the smallest container to be gripped by the insert 810. In one illustration, when the radius R2 is about 0.42 inches, the insert 810 may be suitable for gripping containers with a neck diameter as small 0.84 inches, or about twice the radius R2, although smaller containers may be used in some examples. Similarly, when the radius R1 is 0.48 inches, insert 810 may be suitable for gripping containers with a neck diameter as large as 0.96 inches, although larger containers may be used in some examples.

Transitions 836, 838 are shown between the sections 830, 832, 834. 12.3 mm). In some examples, transitions 836, 838 may be smoothed. For example, transitions 836, 848 may be machined to a third radius, such as 0.02 inches. In some examples, as best shown in FIG. 12, the insert 810 may have two curved notches 822a, 822b. This may allow the insert 810 to be placed into a body portion, such as body portion 106a shown in FIG. 1, in multiple orientations (e.g., both "right side up" and "up side down").

Referring again to FIG. 8, the angular sweep of the curved notch 822a may determine the pivot range of the insert 810. For example, the total angular sweep of the curved notch 822a, shown in FIG. 8 measured relative to the pivot point 820, may be given by A1. In some examples, A1 may be between 45° and 90°. The position of the curved notch 822a may be described by a radius R3 measured from the pivot point 820. In some examples, the depth of the curved notch 822a may be selected to correspond to the shape of the detent riding in the notch 822a. For example, when the detent is rounded, the notch 822a may also be rounded. In the example shown in FIG. 12, the depth of the notch 822a may be described by a radius R5 measured a position offset from a side of the insert 810 by a distance D4. In some examples, the radius R5 may be between about 0.05 inches and 0.07 inches and the distance D4 may be between about 0.02 inches and 0.05 inches.

Referring again to FIG. 8, in some examples, the convex surface 818 may also be rounded and may have a constant radius R4, measured from the pivot point 820. The total angular sweep of the insert 810 may be given by an angle A2, which may be any suitable value including, for example, between about 70° and about 110°. A width of the insert 810 may be of any suitable value, for example, D3 shown in FIG. 11. In some examples, D3 may be between about 0.10 inches and 0.15 inches.

Figure 13:
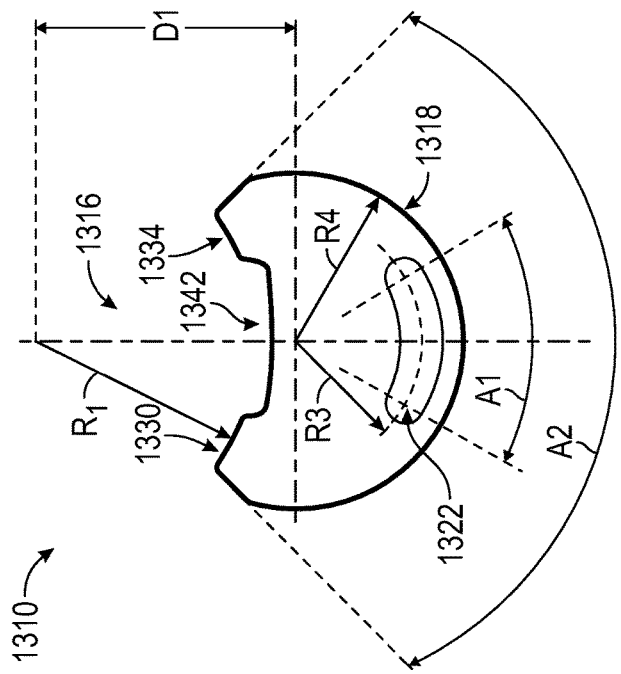
FIG. 13 shows a top view of another example insert having a notch on the concave portion.

FIG. 13 shows a top view of another example insert 1310 having a notch 1342 on the concave portion 1316. Similar to FIGS. 8, 11, and 12, FIG. 13 includes dimensions for various features of the example insert 1310. These are examples showing one manner in which the example insert 1310 may be configured. Inserts according to various examples may be constructed with suitable dimensions and/or tolerances different from those shown in FIG. 13. In FIG. 13, edge sections 1330 and 1334 may be curved at a first radius, R1. Between the edge sections 1330, 1334, the example insert 1310 includes a notch 1342. In some examples, the notch 1342 is dimensioned such that containers gripped by a gripper assembly including the insert 1310 may not contact the notched section. For example, the width and depth of the notch 1342 may be selected such that when the edges of the notch contact a container, the container does not protrude towards the notch by a distance greater than the notch depth. Stated another way, the notch 1342 isolates the remainder of the container from the insert 1310.

Figure 14:
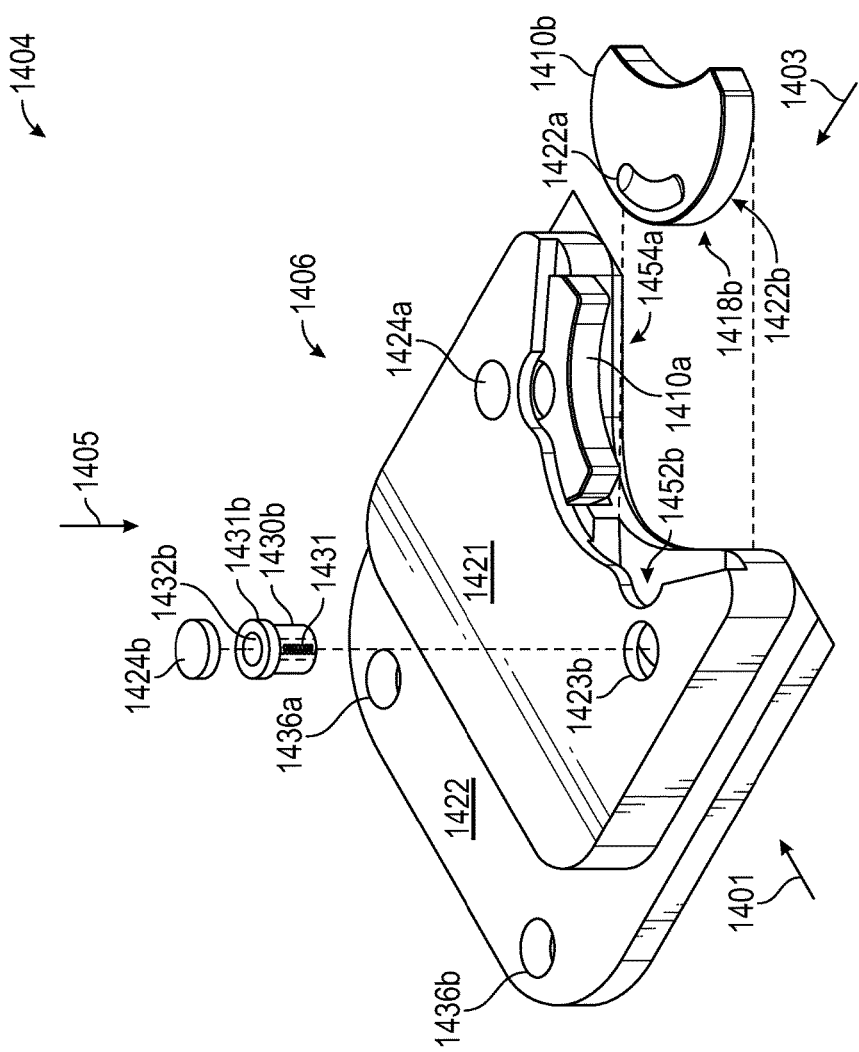
FIG. 14 shows a perspective view of an example insert holder with inserts including exploded components to demonstrate assembly.

FIG. 14 shows a perspective view of an example insert holder 1404 including exploded components to demonstrate assembly. The body portion 1406 includes a skirt section 1422 and insert mounting section 1421, for example, similar to the insert holder 504 shown in FIG. 5. Mounting section 1421 includes a mounting cavity 1452b for receiving the insert 1410b. A similar mounting cavity 1452a may receive insert 1410a as shown. Mounting cavities 1452a, 1452b may comprise a concave surfaces for receiving convex surfaces of the respective inserts 1410a, 1410b (e.g., the convex surface 1418b of the insert 1410b is shown in FIG. 14). Concave surfaces of mounting cavities are shown in more detail in FIGS. 17 and 18 below.

FIG. 14 also illustrates the installation of a detent 1432b. For example, the insert mounting section 1421 may comprise a hole 1423b positioned over the mounting cavity 1452. In some examples, a corresponding hole 1423b may be positioned on a bottom of the body portion 1406 opposite the hole 1423b. The detent 1432b, in the example of FIG. 14 is a ball bearing. The detent 1432b may be inserted into a collar 1430b. In some examples, a spring 1431 may be inserted into the collar 1430b prior to the detent 1432b to bias the detent away from the collar 1430b (and towards the installed insert). A flange 1431b may be installed to secure the spring 1431 and detent 1432b in the collar 1430b. The collar 1430b, detent 1432b, and flange 1431b may be inserted into the hole 1423b. In some examples, the collar 1430b is press-fit into the opposite hole. A cap 1424b may be installed, for example press-fit, into the hole 1423b. A similar cap 1424a is shown covering a hole opposite the hole 1423b (the hole obscured in FIG. 14 by the cap 1424a).

When installed, the detent 1432b is optionally biased to the position shown in FIG. 14 by the spring 1431 or other suitable biasing element. When pushed into the collar 1430b with a force to overcome the spring 1431, the detent 1432b may be received into the collar 1430b. For example, when a leading edge of the insert 1410b contacts the detent within the mounting cavity 1452b, the detent 1432 may be received into the collar, allowing the insert 1410b to slide into the mounting cavity 1452b. When the detent 1432b reaches a curved notch 1422b on the underside of the insert 1410b, it may rebound into the curved notch 1422b, securing the insert 1410b. As the insert 1410b pivots, as described herein, the detent 1432b rides within the curved notch 1422b to facilitate self-alignment of the surfaces of the insert along the container.

Figure 15:
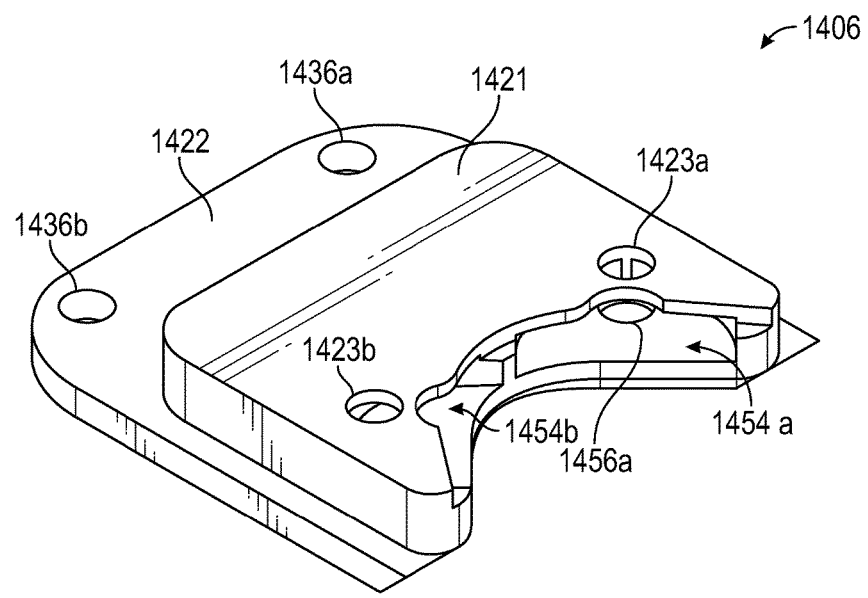
FIGS. 15-20 show additional views of the body portion of the insert holder of FIG. 14.
Figure 16:
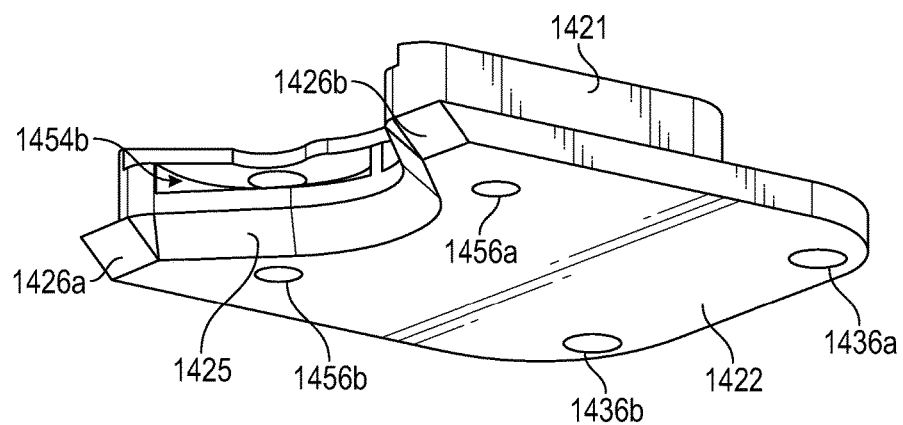
Figure 17:
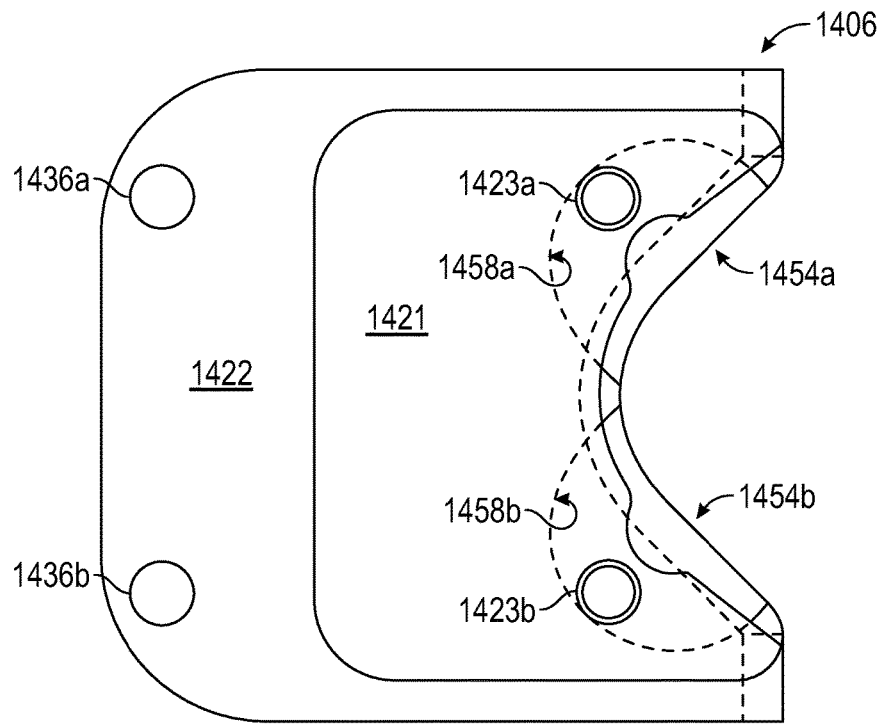
Figure 18:
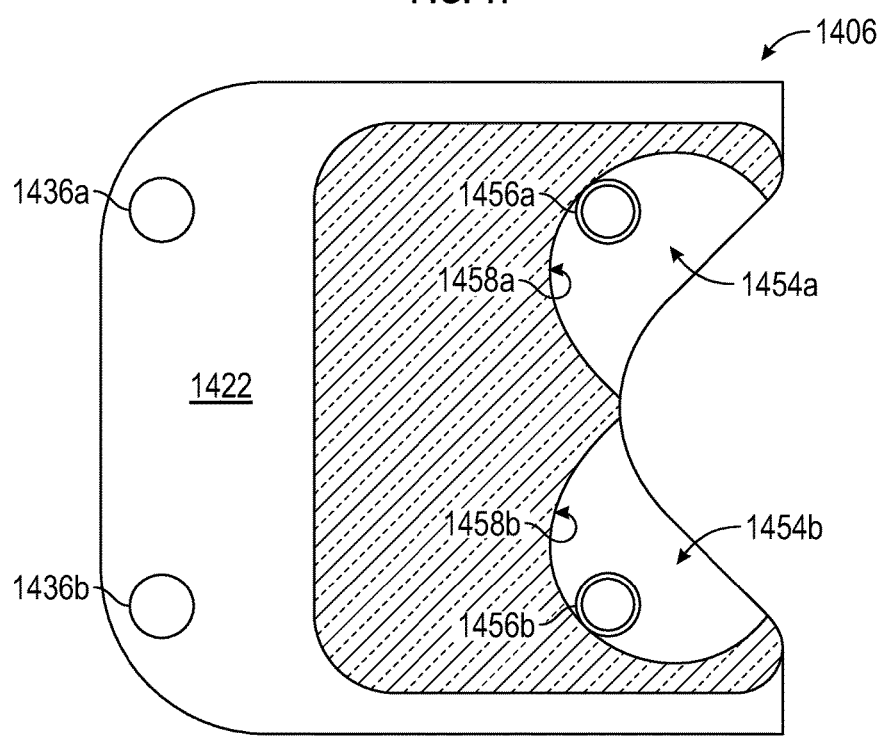
Figure 19:
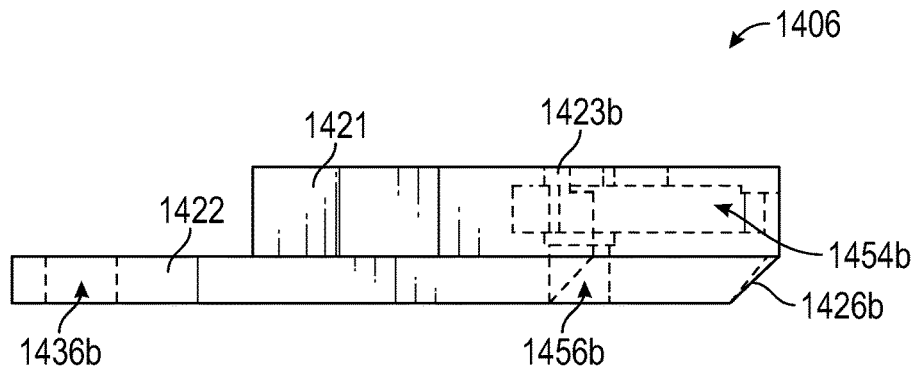
Figure 20:
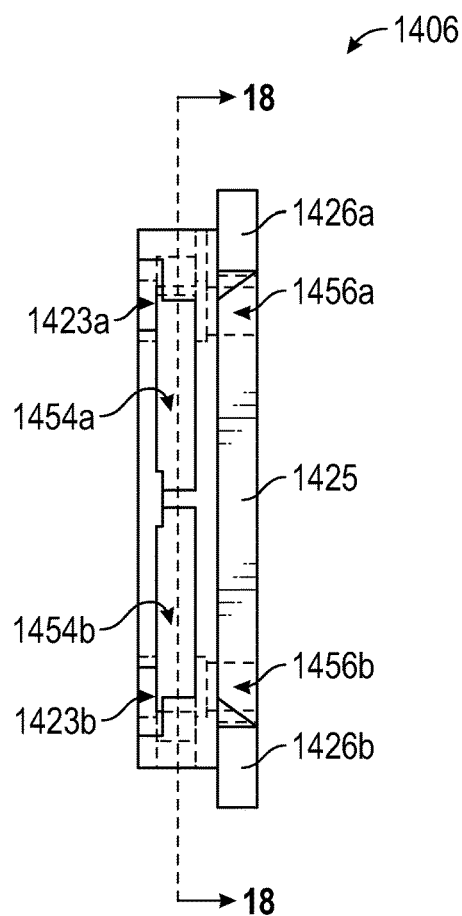

FIGS. 15-20 show additional views of the body portion 1406 of the insert holder 1404 of FIG. 14. FIGS. 15 and 16 are perspective views of the body portion 1406. FIG. 19 is a side view of the body portion 1406 in the direction of the arrow 1401 in FIG. 14. FIG. 20 is a side view of the body portion 1406 in the direction of the arrow 1403 in FIG. 14. FIG. 17 is a top view of the body portion 1406 in the direction of the arrow 1405 in FIG. 14. FIG. 18 is a cross-sectional view of the body portion 1406 along the line AA shown in FIG. 20.

FIGS. 15, 16, 19 and/or 20 illustrate chamfered edges 1425, 1426a, 1426b that may be similar to the chamfered edges 525, 526a, 526b described herein above. FIGS. 15, 16, 17, 18, and/or 19 also show mounting holes 1436a, 1436b that may be similar to mounting holes 536a, 536b described above. FIGS. 15 and 16 show additional views of the mounting cavity 1454b, while FIG. 15 shows an additional view of the mounting cavity 1454a. Additional views of both mounting cavities 1454a, 1454b are shown in FIGS. 17, 18, 19 and/or 20. In the mounting cavity 1454a, FIG. 15 shows an example opposite hole 1456a, that may receive a collar similar to the collar 1430b. FIG. 16 shows opposite holes 1456a and 1456b. For example, the collar 1430b shown in FIG. 14 may be received into opposite hole 1456b. Opposite holes 1456a, 1456b are also shown in FIGS. 18, 19, and/or 20. FIGS. 17-18 show concave sections 1458a, 1458b of the respective mounting cavities 1454a, 1454b.

Figure 21:
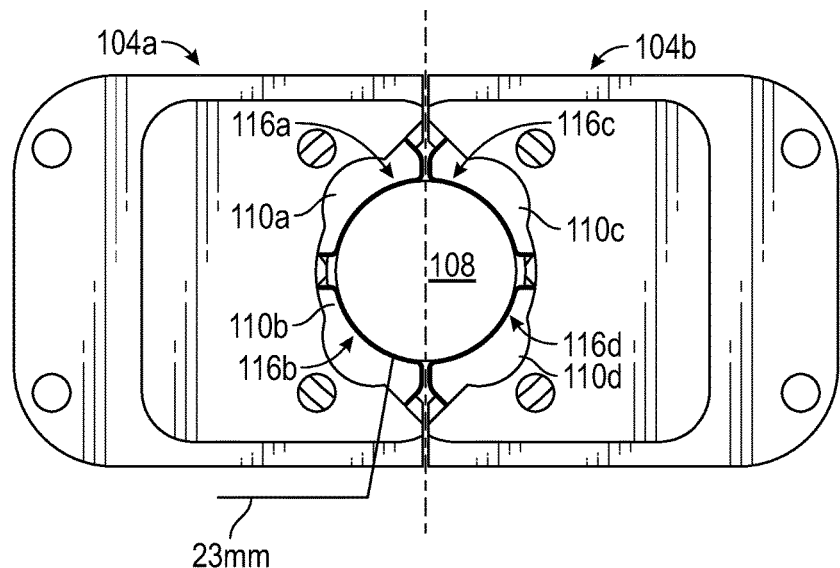
FIG. 21 is a diagram showing a top view of an example of the insert holders of FIGS. 1 and 2 in a closed position around the container.

FIG. 21 is a top view of diagram showing an example of the insert holders 104a, 104b of FIGS. 1 and 2 in a closed position around the container 108. In some examples, the inserts 110a, 110b, 110c, 110d may be dimensioned similar to what is shown in FIGS. 8, 11 and 12. For example, the radii of the central, smaller diameter portions of the concave surfaces 116a, 116b, 116c, 116d may be about 11.5 mm. The container 108 may have a diameter of about 23 mm, as indicated, which is twice the radii of the central sections. When the insert holders 104a, 104b are closed around the container 108, the inserts 110a, 110b, 110c, 110d self-articulate to match the curvature of the container, as shown. For example, because the radius of the example container 108 matches the radius of the central portions of the concave surfaces 116a, 116b, 116c, 116d, the inserts 110a, 110b, 110c, 110d self-articulate to the illustrated position where the central portions are flush with the container 108.

Figure 22:
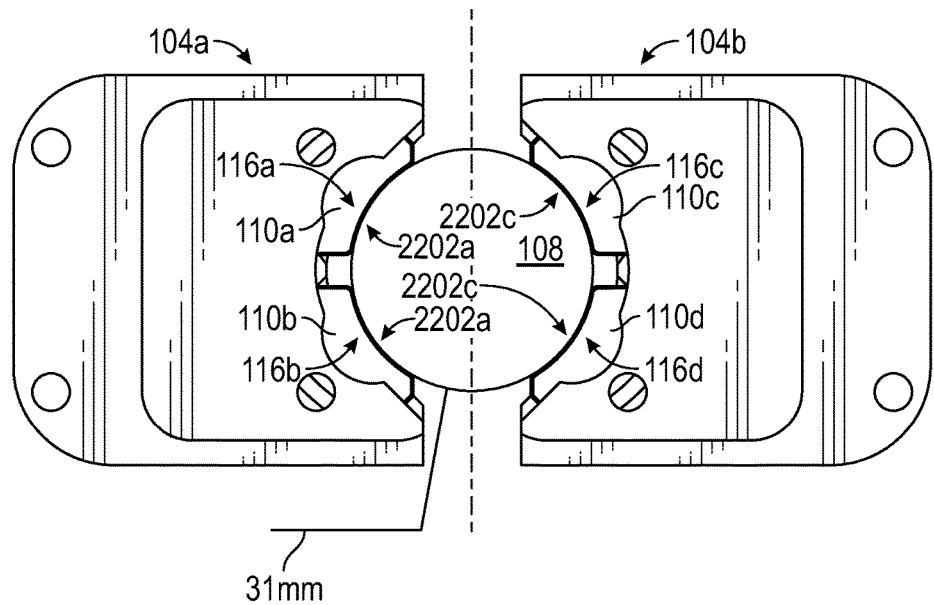
FIG. 22 is a diagram showing a top view of an example of the insert holders of FIGS. 1, 2, and 21 in a closed position around a second container with a larger diameter than the container of FIG. 21.

FIG. 22 is a diagram showing a top view of an example of the insert holders 104a, 104b of FIGS. 1, 2, and 21 in a closed position around a second container 108' with a larger diameter (e.g., 31 mm). The inserts 110a, 110b, 110c, 110d are pivoted relative to their position in FIG. 21 and oriented to the container 108'. For example, as the insert holders 104a, 104b move towards the container 108', the inserts 110a, 110b, 110c, 110d contact the container 108' and self-articulate to generate contact points at or near the edge sections of the concave surfaces 116a, 116b, 116c, 116d. This leaves gaps 2202a, 2202b, 2202c, 2202d between the smaller-radius central sections of the concave surfaces 116a, 116b, 116c, 116d and the container 108'. For example, as the insert holders 104a, 104b close towards one another, they inserts 110a, 110b, 110c, 110d may initially contact the container 108, 108'. In some examples, the force of the container 108, 108' against the inserts 110a, 110b, 110c, 110d causes the inserts to self-articulation to the positions shown in FIGS. 21 and 22.

Figure 23:
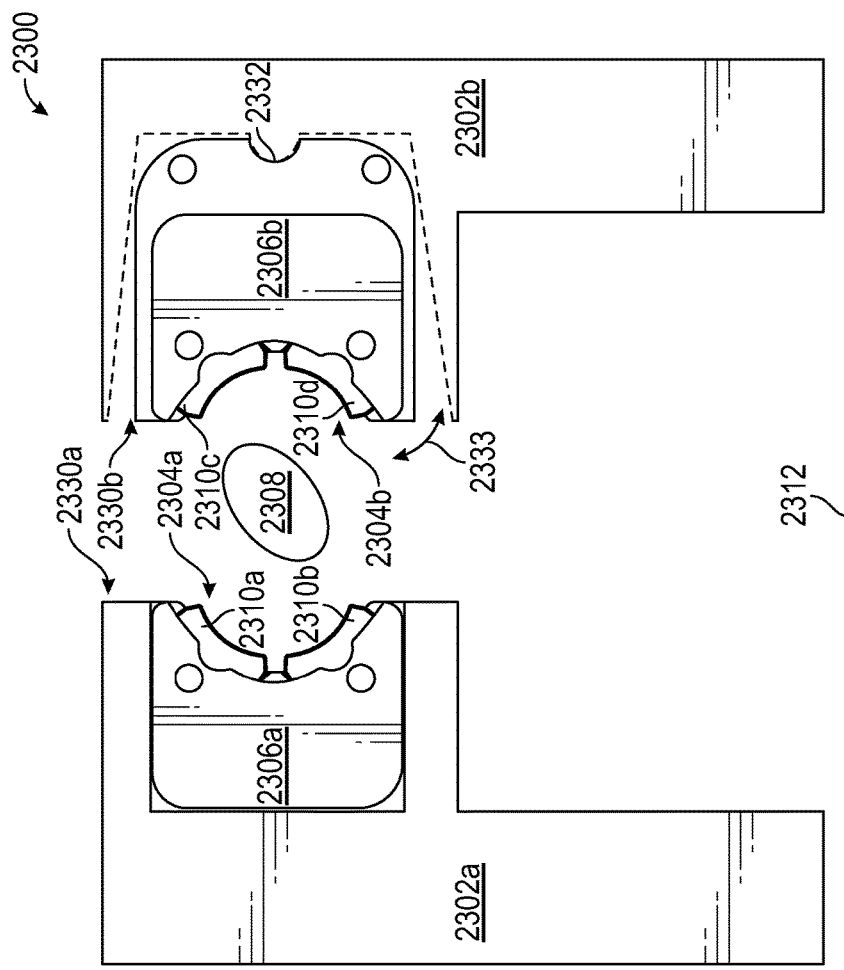
FIG. 23 is a diagram showing a top view of an example of a container gripper assembly including insert holders and inserts and configured to grip non-round containers.

FIG. 23 is a diagram showing a top view of an example of a container gripper assembly 2300 including insert holders and configured to grip non-round containers. The container gripper assembly 2300 comprises jaw members 2302a and 2302b as well as insert holders 2304a, 2304b. Insert holders 2304a, 2304b may be configured similar to the insert holders described herein. For example, insert holders 2304a, 2304b may comprise respective body portions 2306a, 2306b and inserts 2310a, 2310b, 2310c, 2310d. The insert holder body portions 2306a, 2306b may be received into respective slots 2330a, 2330b. Insert holder 2304a may ride within the slot 2330a and be configured similar to the configuration of the insert holder 104a and jaw member 102a of FIG. 1.

Body portion 2306b and jaw member 2302b may be configured to allow the insert holder 2304b to pivot within the jaw member, for example, as indicated by the arrow 2333. For example, the body portion 2306 may comprise a concave surface 2334. The jaw member 2302b, within the slot 2330b, may comprise a convex surface 2332. The convex surface 2332 may be received within the concave surface 2334 as shown, allowing the body portion 2306b, and the insert holder 2304b as a whole, to pivot. Pivoting of the insert holder 2304b allows the insert holder assembly 2300 to more easily grip non-round containers, such as the container 2308, which has an oval cross-section. Non-round containers may include containers with an oval cross-section or any other cross-sectional shape that is not round such as, for example, square, rectangular, irregular shaped, etc. For example, closure force on the inserts 2310a, 2310b, 2310c, 2310d causes the inserts to self-articulate or pivot, as described with respect to FIGS. 21 and 22, and optionally also causes the insert holder 2304b to pivot, providing a better grip on the non-round container 2308. Stated another way, each of the inserts and one or more of the grippers articulates around the container to engage in surface-to-surface contact (e.g., including multipoint contact) to ensure reliable grasping and retention of a container within the container jaw assembly 2300. The container jaw assemblies described herein, including the jaw assembly 2300 thereby readily alter their orientation around the container during grasping to ensure a reliable grip around containers having one or more of regular or irregular shapes including, but not limited to, circular, ovular, diamond, square, polygonal shapes or the like.

Although the insert holder 2304b pivots with a concave and convex surface pair, in some examples, other pivot mechanisms may be used such as, for example, a pin or other suitable fastener at a pivot point. Also, in some examples, pivoting of the insert holder 2304b within the jaw member 2302b comprises a detent and curved groove mechanism similar to that used to facilitate pivoting of the inserts 2310a, 2310b, 2310c, 2310d to secure the insert holder 2304b to the jaw member 2302b. Additionally, although the right insert holder 2304b pivots in the example of FIG. 23, in some examples, the left insert holder 2304a or both insert holders 2304a, 2304b may be pivotable.

Figure 24:
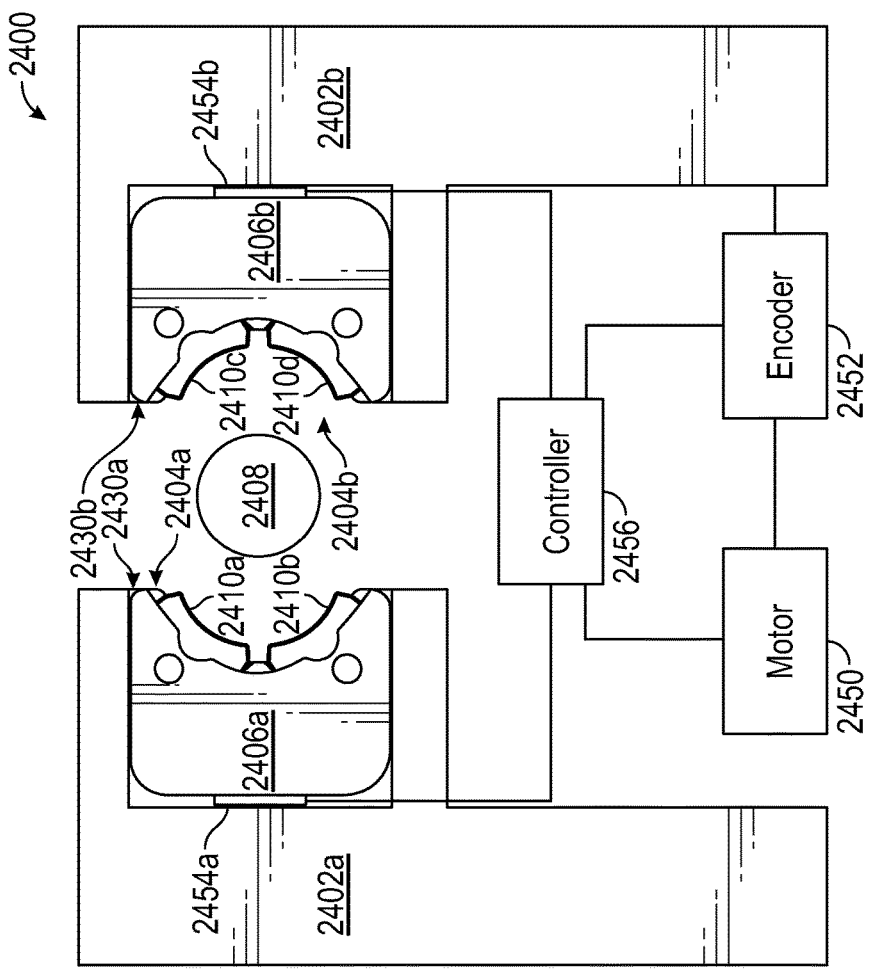
FIG. 24 is a diagram showing a top view of an example of a container gripper assembly including insert holders and configured to utilize force feedback.

FIG. 24 is a diagram showing a top view of an example of a container gripper assembly 2400 including insert holders and configured to utilize force feedback. The container gripper assembly 2400, for example, includes optional force sensors 2454a, 2454b and an optional encoder 2452 or other position sensor for sensing the position of the jaw members 2402a, 2402b (e.g., a distance of the jaw members 2402a, 2402b from one another).

The container gripper assembly 2400 comprises the jaw members 2402a and 2402b as well as insert holders 2404a, 2404b. Insert holders 2404a, 2404b may be configured similar to the insert holders described herein. For example, insert holders 2404a, 2404b may comprise respective body portions 2406a, 2406b and inserts 2410a, 2410b, 2410c, 2410d. The insert holder body portions 2406a, 2406b may be received into respective slots 2430a, 2430b. Insert holder 2404a may ride within the slot 2430a and be configured similar to the configuration of the insert holder 104a and jaw member 102a of FIG. 1.

Force sensors 2454a, 2454b are shown positioned between the body portions 2406a, 2406b of the respective insert holders 2404a, 2404b and the respective slots 2430a, 2430b of the jaw members 2402a, 2402b. In this position, the force applied by the insert holders 2404a, 2404b against the force sensors 2454a, 2454b may be equivalent to the force exerted by the inserts 2410a, 2410b, 2410c, 2410d on the container 2408. It will be appreciated that the force sensors 2454a, 2454b may be located at any suitable position of the container gripper assembly 2400 suitable for sensing the force exerted on the container 2408 or an equivalent to that force.

Force sensors 2454a, 2454b may be or include any suitable force sensor including, for example, a strain gauge, piezoelectric sensors, capacitive load cells, etc. Force sensors 2454a, 2454b may include any suitable package including, for example, a flexible package, a recessed button package, etc. Example force sensors that may be used include sensors from the FlexiForce® line of flexible pressure sensors available from Tekscan Incorporated, etc.

Optionally, the container griper assembly 2400 also comprises an encoder 2452 positioned to detect the relative position of the jaw members 2402a, 2402b. The encoder 2452 may include a rotary encoder positioned to measure rotations of the motor 2450 that drives the jaw members 2402a, 2402b. The motor 2450, in some examples, includes a linear encoder coupled, for example, to one or both of the jaw members 2402a, 2402b or other suitable component that moves with the jaw members 2402a, 2402b. In some examples, in addition to or instead of the encoder 2452, the container gripper assembly 2400 may utilize a stepper motor to control and detect the position of the jaw members 2402a, 2402b.

The force sensors 2454a, 2454b and/or encoder 2452 may be in communication with a controller 2456. The controller 2456 may comprise any suitable programmable processor, state machine, control loop feedback system (such as a Proportional Integral Derivative (PID) control loop), etc.

The controller 2456 may be configured to receive signals from the force sensors 2454*a*, 2454*b* and modify the operation of the motor 2450 in response. For example, the controller 2456 may activate the motor 2450 to bring the jaw members 2402*a*, 2402*b* towards one another, as described herein. As the jaw members 2402*a*, 2402*b* move towards one another, the inserts 2410*a*, 2410*b*, 2410*c*, 2410*d* contact the container 2408 as described herein. The controller 2456 may apply a position and/or a force threshold for the motor 2450. For example, when pressure sensors 2454*a*, 2454*b* provide a signal indicating that the pressure on the container 2408 has reached a threshold pressure level, then controller 2456 may slow or stop the motor 2450 to slow or stop the motion of the jaw members 2402*a*, 2402*b* and thereby slow or stop the increase of the force exerted on the container 2408 by the inserts 2410*a*, 2410*b*, 2410*c*, 2410*d*. Similarly, in some examples, when the encoder 2452 or other position sensor indicates that the jaw members 2402*a*, 2402*b* have reached a threshold position relative to one another, the controller 2456 may slow or stop the motor 2450.

Various dimensions and other numerical values are described herein by a range of possible values. When a range is described herein, it is understood to include the disclosed endpoints of the range and to include every value falling between the endpoint. Also, unless otherwise indicated, dimension or other numerical values described by a range of possible values may, in some examples, take values outside of the provided range.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example 1 is a container gripper assembly, comprising: a first jaw member comprising: a first insert holder; a first pivotable insert positioned at least partially in the first insert holder and comprising a first concave surface; and a second pivotable insert positioned at least partially in the first insert holder and comprising a second concave surface; and a second jaw member comprising: a second insert holder; a third pivotable insert positioned at least partially in the second insert holder and having a third concave surface; and a fourth pivotable insert positioned at least partially in the second insert holder and having a fourth concave surface, wherein the first jaw member is movable towards the second jaw member to grip a container between at least the first pivotable insert and the third pivotable insert, and wherein the first concave surface and the third concave surface are pivotable to at least partially contact the container when the container is gripped.

In Example 2, the subject matter of Example 1 optionally includes wherein the first insert holder comprises a cavity to receive the first pivotable insert.

In Example 3, the subject matter of any one or more of Examples 1-2 optionally includes wherein the first pivotable insert comprises a notch positioned on a surface of the first pivotable insert that is about perpendicular to the first concave surface, and wherein the first insert holder comprises a detent received into the notch.

In Example 4, the subject matter of Example 3 optionally includes a spring to bias the detent towards the first pivotable insert.

In Example 5, the subject matter of any one or more of Examples 3-4 optionally includes wherein the first pivotable insert comprises a first convex surface opposite the first concave surface.

In Example 6, the subject matter of any one or more of Examples 3-5 optionally includes wherein the notch is curved to permit the detent to slide along the notch as the first pivotable insert pivots in the first insert holder.

In Example 7, the subject matter of any one or more of Examples 1-6 optionally includes wherein the first concave surface comprises: a first edge section curved at a first radius of curvature; a second edge section curved at the first radius of curvature; and a middle edge section positioned between the first edge section and the second edge section, wherein the middle edge section is curved at a second radius of curvature larger than the first radius of curvature.

In Example 8, the subject matter of any one or more of Examples 1-7 optionally includes wherein the first concave surface comprises: a first edge section curved at a first radius of curvature; a second edge section curved at the first radius of curvature; and a notched section positioned between the first edge section and the second edge section.

In Example 9, the subject matter of any one or more of Examples 1-8 optionally includes wherein the first jaw member further comprises a slot to receive the first insert holder, wherein the slot has a width larger than a width of the first insert holder.

In Example 10, the subject matter of any one or more of Examples 1-9 optionally includes a force sensor positioned to sense a force exerted by the first pivotable insert and the second pivotable insert on the container; and a motor positioned to move the first jaw member towards the second jaw member; and a controller in communication with the force sensor and configured to: activate the motor to move the first jaw member towards the second jaw member; determine that the force sensed by the force sensor exceeds a threshold force; and modify an operation of the motor.

In Example 11, the subject matter of Example 10 optionally includes wherein the force sensor is positioned between the first insert holder and a portion of the first jaw member.

In Example 12, the subject matter of any one or more of Examples 1-11 optionally includes a position sensor to sense a relative position of the first jaw member and the second jaw member; a motor positioned to move the first jaw member towards the second jaw member; and a controller in communication with the position sensor and configured to: activate the motor to move the first jaw member towards the second jaw member; determine that the relative position of the first jaw member and the second jaw member is greater than a position threshold; and modify an operation of the motor.

In Example 13, the subject matter of any one or more of Examples 1-12 optionally includes a seal for placing on the container to fill the container with a fluid.

Example 14 is a container gripper assembly comprising: a first jaw member comprising a first plurality of pivotable inserts; and a second jaw member comprising a second plurality of pivotable inserts, wherein the first jaw member is movable towards the second jaw member to grip a container between the first plurality of pivotable inserts and the second plurality of pivotable inserts.

In Example 15, the subject matter of Example 14 optionally includes wherein the first plurality of pivotable inserts comprises a first pivotable insert having a first concave surface that at least partially contacts the container when the container is gripped.

In Example 16, the subject matter of Example 15 optionally includes wherein the first pivotable insert comprises a notch positioned on a surface of the first pivotable insert that is about perpendicular to the first concave surface, and wherein the first jaw member comprises a first detent received into the notch.

In Example 17, the subject matter of any one or more of Examples 15-16 optionally includes wherein the first concave surface comprises: a first edge section curved at a first radius of curvature; a second edge section curved at the first radius of curvature; and a middle edge section positioned between the first edge section and the second edge section, wherein the middle edge section is curved at a second radius of curvature larger than the first radius of curvature.

In Example 18, the subject matter of any one or more of Examples 15-17 optionally includes wherein the first concave surface comprises: a first edge section curved at a first radius of curvature; a second edge section curved at the first radius of curvature; and a notched section positioned between the first edge section and the second edge section.

In Example 19, the subject matter of any one or more of Examples 14-18 optionally includes wherein the first jaw member comprises a cavity for receiving the first plurality of pivotable inserts.

In Example 20, the subject matter of any one or more of Examples 14-19 optionally includes a force sensor positioned to sense a force exerted on the container; and a motor positioned to move the first jaw member towards the second jaw member; and a controller in communication with the force sensor and configured to: activate the motor to move the first jaw member towards the second jaw member; determine that the force sensed by the force sensor exceeds a threshold force; and modify an operation of the motor.

What is claimed is:

1. A container gripper assembly, comprising: a first jaw member comprising:
    a first insert holder;
    a first pivotable insert positioned at least partially in the first insert holder and comprising a first concave surface; and a
    a second pivotable insert positioned at least partially in the first insert holder and comprising a second concave surface; and
    a second jaw member comprising:
    a second insert holder;
    a third pivotable insert positioned at least partially in the second insert holder and having a third concave surface; and
    a fourth pivotable insert positioned at least partially in the second insert holder and having a fourth concave surface, wherein the first jaw member is movable towards the second jaw member to grip a container between at least the first pivotable insert and the third pivotable insert, and wherein the first concave surface and the third concave surface are pivotable to at least partially contact the container when the container is gripped.

2. The container gripper assembly of claim 1, wherein the first insert holder comprises a cavity to receive the first pivotable insert.

3. The container gripper assembly of claim 1, wherein the first pivotable insert comprises a notch positioned on a surface of the first pivotable insert that is about perpendicular to the first concave surface, and wherein the first insert holder comprises a detent received into the notch.

4. The container gripper assembly of claim 3, further comprising a spring to bias the detent towards the first pivotable insert.

5. The container gripper assembly of claim 3, wherein the first pivotable insert comprises a first convex surface opposite the first concave surface.

6. The container gripper assembly of claim 3, wherein the notch is curved to permit the detent to slide along the notch as the first pivotable insert pivots in the first insert holder.

7. The container gripper assembly of claim 1, wherein the first concave surface comprises:
    a first edge section curved at a first radius of curvature;
    a second edge section curved at the first radius of curvature; and
    a middle edge section positioned between the first edge section and the second edge section, wherein the middle edge section is curved at a second radius of curvature larger than the first radius of curvature.

8. The container gripper assembly of claim 1, wherein the first concave surface comprises:
    first edge section curved at a first radius of curvature;
    a second edge section curved at the first radius of curvature; and a notched section positioned between the first edge section and the second edge section.

9. The container gripper assembly of claim 1, wherein the first jaw member further comprises a slot to receive the first insert holder, wherein the slot has a width larger than a width of the first insert holder.

10. The container gripper assembly of claim 1, further comprising: a force sensor positioned to sense a force exerted by the first pivotable insert and the second pivotable insert on the container; and
    a motor positioned to move the first jaw member towards the second jaw member; and
    a controller in communication with the force sensor and configured to:
        activate the motor to move the first jaw member towards the second jaw member;
        determine that the force sensed by the force sensor exceeds a threshold force; and
        modify an operation of the motor.

11. The container gripper assembly of claim 10, wherein the force sensor is positioned between the first insert holder and a portion of the first jaw member.

12. The container gripper assembly of claim 1, further comprising: a position sensor to sense a relative position of the first jaw member and the second jaw member;

a motor positioned to move the first jaw member towards the second jaw member; and a controller in communication with the position sensor and configured to:

activate the motor to move the first jaw member towards the second jaw member;

determine that the relative position of the first jaw member and the second jaw member is greater than a position threshold; and modify an operation of the motor.

13. The container gripper assembly of claim 1, further comprising a seal for placing on the container to fill the container with a fluid.

* * * * *